Patented Aug. 17, 1937

2,090,217

UNITED STATES PATENT OFFICE 2,090,217

METHOD OF AND APPARATUS FOR CONDUCTING CATALYTIC REACTIONS

Henry F. Merriam, West Orange, N. J., assignor to General Chemical Company, New York, N. Y., a corporation of New York Application July 23, 1932, Serial No. 624,179

12 Claims. (Cl. 23—226)

This invention relates generally to a method of and apparatus for conducting catalytic reactions, more particularly the reduction of sulfur dioxide to sulfur and/or hydrogen sulfide. The invention contemplates chiefly the reduction of sulfur dioxide to elemental sulfur and accordingly, for convenience, the invention is herein described in connection with the production of elemental sulfur, although it is to be understood that the principles of the present improvements apply to the formation of hydrogen sulfide if such end product is desired.

More particularly, the invention relates to a process for the production of elemental sulfur from sulfur dioxide or gas mixtures containing the same. In the more limited aspects, the invention is directed to the production of sulfur from relatively concentrated sulfur dioxide gas mixtures such as may be obtained, for example, by decomposition of sulfuric acid sludges comprising waste products of oil refining processes. The invention further contemplates the reduction of comparatively concentrated sulfur dioxide gas mixtures in a reducing reaction involving the use of finely divided catalytic materials such as bauxite fines.

It has heretofore been proposed to reduce sulfur dioxide to sulfur by passing a gas mixture containing reacting proportions of sulfur dioxide and reducing agent over catalysts such as bauxite. The reduction of sulfur dioxide to elemental sulfur by means of reducing agents takes place in an exothermic reaction in which relatively large quantities of heat are generated. In such reactions, when the temperature rises excessively, hydrogen sulfide tends to form, thus reducing the amount of sulfur recovered as such. Accordingly, when elemental sulfur is the desired end product, the reaction is preferably carried out at lower temperatures.

In prior methods, the sulfur dioxide concentration of the gas stream has been comparatively low, and correspondingly small amounts of heat are evolved. Hence, it has been possible to carry out the reduction process by passing the reacting gas mixture through beds of relatively closely packed catalytic material since the small quantities of waste heat generated give rise to no particular difficulties in controlling the temperature of the reaction. However, when operating with concentrated sulfur dioxide gas mixtures, large quantities of heat are evolved, and in order to recover maximum amounts of sulfur and reduce the formation of hydrogen sulfide to a minimum, adequate temperature control of the process is desirable. Such temperature control may be had, for example, by diluting the gas mixture, prior to reduction, with inert gases. This practice, however, involves circulation through the system of large volumes of gas, and makes necessary the use of converters of large cross-section and catalytic masses composed of coarse granular, pelleted, briquetted or otherwise specially formed catalytic material, in order to permit the operation of the process without causing excessive resistance to the flow of the gas stream passing through the reduction chambers in the system.

One of the principal objects of the invention lies in the provision of a process by which elemental sulfur may be economically produced by reduction of the sulfur dioxide content of a concentrated sulfur dioxide gas mixture. A further object of the invention comprises the provision of a method whereby large volumes of reacting gases may be passed through a reaction chamber or converter and effectively contacted with catalytic material therein without creating high resistance to gas flow through the converter. The invention also contemplates a method by which catalytic material in finely divided form may be advantageously employed, and further comprises the provision of apparatus by which the improved process may be carried out.

According to one preferred embodiment of the invention, elemental sulfur is produced from a relatively concentrated sulfur dioxide gas, such as may be obtained by the decomposition of acid sludges, by mixing with the sulfur dioxide gas a gaseous reducing agent, and amounts of inert gases in quantities to dilute the reactant gas mixture to such extent that the temperature of the subsequent reduction reaction, carried out in the presence of a catalyst, may be controlled and maintained within hereinafter specified optimum limits. This dilution of the sulfur dioxide gas involves generally, a comparatively large increase in volume of the gas mixture. According to the invention, the reaction of sulfur dioxide and reducing agent may be effectively carried out, notwithstanding the large increase in gas volume, by passing the gas stream through a catalyst body comprising a plurality of suspended mounds of loosely associated, finely divided catalytic material. The catalyst body in the converter, maintained in such condition throughout the reaction, includes a large number of relatively wide, unobstructed circuitous gas passages whereby efficient contacting of reactant gases and catalyst is effected, and resistance to flow of large volumes of gas through the catalytic body is minimized.

A further appreciation of the objects and advantages of the invention may be had from a consideration of the following description taken in connection with the accompanying drawing in which,—

Fig. 1 is an elevation, partly in section, of one form of apparatus in which the process constituting the invention may be carried out, Fig. 2 is a perspective showing the arrangement of the baffles in the reaction chamber, and Fig. 3 indicates diagrammatically an acid sludge decomposing unit.

Referring to the drawing, the reference numeral 10 indicates a converter comprising preferably a cylindrical steel shell 11 having therein a firebrick lining 12. The lower end of the converter is funnel-shaped, and communicates through an opening 13 with an outlet chamber 14 adapted to receive catalytic material being discharged from the converter. Passage of material through opening 13 is controlled by a slide valve 15. Catalytic material may be withdrawn from the chamber 14 through an outlet conduit 16, likewise controlled by a slide valve 17. It will be apparent that catalyst may be discharged from the converter without admitting air thereto.

At the lower end of the reaction chamber is a firebrick arch 20 supporting a plurality of baffles 21 constituting checkerwork indicated generally by the reference numeral 22. One feature of the invention comprises the particular construction and arrangement of the checkerwork in the reaction chamber so as to afford intimate contact of the reactant gases, and to reduce to a minimum resistance to flow of the gas stream through the converter. Checkerwork 22 comprises a plurality of superposed layers or series 23, each series including a plurality of horizontally disposed, elongated baffles 21. The baffles 21, of each series 23, are preferably made of bauxite brick and are arranged parallel to each other and spaced apart a distance somewhat less than the width of an individual baffle 23. The baffles of each series contact with and are disposed preferably at right angles with respect to the baffles of immediately adjacent upper and lower series. As will be seen from an inspection of Fig. 2, the baffles of alternate series are parallel, but alternate series are offset horizontally so that there are no vertical channels of appreciable length in the checkerwork. Accordingly, the gas passages through the checkerwork are circuitous, and catalytic material on the baffles presents a large surface to the gas stream flowing through the converter.

Finely divided catalytic material may be fed into the upper end of the converter through a feed mechanism 30, terminating at the lower end in an inlet conduit 31 projecting into the reaction chamber. The charging chamber 32 of the feed mechanism is provided with an inlet valve 34 operated by a lever 35 pivoted at 36. Flow of material from the chamber 32 into the conduit 31 is controlled by a similar valve 40 on the lower end of a rod 41 passing axially through the valve 34, valve 40 being operated by a lever 44 pivoted at 45. Immediately beneath the lower end of the inlet conduit 31 is a cone 46 adapted to distribute the catalytic material evenly over the upper surface of the checkerwork 22.

Reacting gases are charged into the converter through a conduit 50 connected at one end to the outlet side of blower 51 and at the other end with an enlarged sleeve 52, surrounding inlet pipe 31, and opening into the reaction chamber. The inlet side of the blower is connected through pipes 55 and 56 with a source of gas supply. Reducing gases may be drawn into the pipe 56 through a connection 57 having therein a control valve 58.

Gaseous products of reaction are discharged from the converter through an outlet pipe 60 leading to suitable condensing apparatus. Any desired quantities of reacted gases may be withdrawn from the lower end of the converter, by the blower 51, through a conduit 61, controlled by valve 62, and opening at one end into the converter and at the other end into the pipe 55 on the inlet side of the blower.

Since the invention has particular application to the production of elemental sulfur from concentrated sulfur dioxide gas mixtures, the following illustrative example is given in connection with the recovery of sulfur from acid sludges.

Sulfuric acid sludges resulting from the refining of oils vary widely in composition, one representative sludge containing 45% sulfuric acid, 35% water, and 18% hydrocarbons. Although the invention is, of course, not dependent upon any particular method for the production of a concentrated sulfur dioxide gas mixture or process for the destructive distillation of acid sludge to produce a concentrated sulfur dioxide gas mixture, decomposition of the sludge may be advantageously effected by externally heating a charge of sludge, in a substantially air-tight retort, such as 65 Fig. 3 of the drawing, at relatively low temperatures, for example from 150–325° C. On heating, the sulfuric acid contained in the sludge is reduced by hydrogen of hydrocarbons and/or by the carbonaceous matter present in the sludge, and the gas mixture evolved and discharged from the retort through line 66 contains sulfur dioxide and water as the major constituents, together with smaller quantities of hydrocarbon vapors, carbon dioxide, carbon monoxide and oxygen.

The exit gases from the acid sludge decomposition apparatus may be cooled to say 40° C., in a cooler 68 of any suitable type and the bulk of the water and hydrocarbon vapors are condensed, separated from the gas stream, and discharged through line 69. Since decomposition of the sludge is preferably effected substantially in the absence of air or other diluting gas, after separation of water and condensable hydrocarbons, the retort gas mixture in line 70 is rich in sulfur dioxide and may contain, for example by volume, 91% sulfur dioxide, 2% water and 7% carbon dioxide.

A gas mixture of such composition is drawn into the apparatus through inlet pipe 56 by blower 51. The valve 58 in pipe 57 is opened to permit admission to the system of reducing agent, for example, natural gas so as to provide in the resulting gas mixture an excess of reducing gases, for instance, the gas mixture in conduit 56, after admission of reducing gas, may contain approximately by volume 61% $SO_2$, 33% $CH_4$, 5% $CO_2$ and the balance water vapor.

A supply of catalytic material, such as bauxite fines, is maintained in the chamber 32 of the feed mechanism. Before reacting gases are admitted to the converter, the valve 40 is opened to permit admission to the converter of sufficient catalytic material to form on the top of each of the baffles small mounds of loosely associated catalytic material, any excess falling through the openings in the arch 20 and into the funnel-shaped bottom of the shell. The gas mixture containing sulfur dioxide and reducing agent is charged into the upper end of the converter by blower 51 and passes downwardly through the checkerwork 22. Because of the particular arrangement of the baffles comprising the checkerwork, there are provided numerous relatively large unobstructed gas passages through the converter. At the same time, the baffling effect of the checkerwork is such as to cause repeated contacts of reacting gases with the large surfaces of catalytic material on the baffles. Because of the relatively rapid movement of the gas stream through the converter and the comparatively finely divided nature of the catalytic material, the latter may tend to drop gradually, though at a relatively low rate, through the reaction chamber, co-current with the flow of the gas stream. The catalytic material passing through arch 20 is collected in the lower end of the shell, and may be withdrawn from the apparatus, without permitting the admission of air to the converter, and returned to charging chamber 32 by any satisfactory mechanism. During operation, the inlet valve 40 may be opened from time to time as required to feed into the converter amounts of catalytic material corresponding to those withdrawn from discharge chamber 14. However, after operation is under way, but little replacement of catalytic material is required.

Reduction of the sulfur dioxide to elemental sulfur in the presence of a bauxite catalyst may be effected at elevated temperatures generally above 425° C. When the operation of the present process is initiated, the incoming gases are preheated by any appropriate means, preferably to about 425–475° C., and introduced at this temperature into the reaction chamber. The reduction reaction taking place in the converter is exothermic, and particularly where the concentration of sulfur dioxide is high, large quantities of heat are generated. If the temperature is permitted to rise about, say, 650° C., relatively large quantities of hydrogen sulfide tend to form. Hence, where it is desired to produce elemental sulfur, the temperature in the reaction chamber should preferably be so controlled as to avoid temperatures at the outlet end of the converter substantially in excess of about 650° C.

Temperature control of the reaction may be had in various ways, although in accordance with the present method, it is preferred to withdraw regulated quantities of reacted gases from the lower end of the converter, and mix the same with the incoming gas stream, thus diluting the latter with reaction products which are largely inert with respect to the reaction. Accordingly, valve 62 in the pipe 61 is opened to permit withdrawal by blower 51 from the converter of sufficient quantities of reacted gases to dilute the gas mixture passing through the pipe 50 into the converter to such extent as to avoid excessive temperatures in the converter. Since in the present example, the concentrated sulfur dioxide gas mixture entering the inlet pipe 56 is at temperatures of about 40° C., the admixture of hot reacted gases from the converter with the incoming gas stream serves a twofold purpose, and in addition to diluting the incoming gas stream to the desired degree, preheats the same so that the temperature of the gas mixture entering the upper end of the converter is about 425–475° C. It will be understood of course, that the quantity of reacted gases withdrawn from the converter through pipe connection 61, admixed with the incoming gas stream and recycled through the converter is dependent upon the particular operating conditions arising. For example, where the gas in conduit 56, after admission of reducing gas through inlet 57, is constituted as above noted, the admixture with such incoming gas of about four to five volumes of reaction product gases will generally be found sufficient to preheat the fresh incoming gas to reactive temperatures and at the same time provide for adequate temperature control in the reaction chamber. Where such quantities of products from the converter are introduced into the incoming gases, the resulting gas mixture in pipe 50 may contain for example by volume 15.0% $SO_2$, 9.0% $CH_4$, 22.0% $CO_2$, 3.0% $H_2S$, 16.0% $S_2$, and balance water vapor. It will be understood that if the temperature of the product gas leaving the reaction chamber through the outlet pipe 60 should rise substantially above 625° C. it is only necessary to adjust the valve 62 so as to permit recirculation of larger quantities of reacted gases through the converter.

The gaseous products of the reaction, discharged from the apparatus through the outlet pipe 60, and containing for example by volume 26.0% $CO_2$, 3.5% $SO_2$, 3.5% $H_2S$, 20.0% $S_2$, 2.3% $CH_4$, and about 44.0% $H_2O$, are passed through any suitable cooler or condenser to effect condensation of sulfur vapor and recovery of sulfur. Should the gases leaving the condenser contain appreciable quantities of sulfur dioxide and hydrogen sulfide, the tail gases of the condenser may, after adjustment of the gas mixture to provide therein reacting proportions of sulfur dioxide and hydrogen sulfide, be passed through a second body of catalyst, such as bauxite, to recover the sulfur.

From the foregoing it will be observed that the present invention provides a process whereby the sulfur dioxide content of relatively concentrated sulfur dioxide gas mixtures can be economically reduced to elemental sulfur by reaction with reducing agent in the presence of a catalyst. The invention further provides for adequate temperature control by diluting the gas stream passing through the converter. By effecting this dilution of the gas stream with reaction products, important operating advantages are obtained. The reaction products are largely inert with respect to the reaction taking place in the converter, and thus provide for adequate temperature control therein. The reaction products contain relatively large amounts of sulfur, and hence when recycled and utilized for temperature control do not effect reduction of the sulfur content of the products discharged from the apparatus through pipe 60, as would be the case in the event that gases other than the reduction products were employed as diluting medium. A high sulfur content in the fully converted gases makes ultimate recovery of sulfur more simple and economical because of the smaller volume of gas to handle.

Because of the particular arrangement of the packing in the converter, dilution of a concentrated gas mixture is made possible, and large volumes of reacting gases may be passed through the converter and intimately contacted therein with large surfaces of catalytic material without causing undue resistance to gas flow through the converter. Additionally, the process is such that finely divided catalytic material which may be carried through and out of the reaction chamber by gas currents may be readily replaced by catalyst fed into the converter for this purpose through inlet 31, thus maintaining the catalyst body in the form of a plurality of suspended mounds of finely divided catalytic material.

A further important aspect of the invention is the provision of a method in which finely divided catalytic material may be economically utilized, thus avoiding expensive preparation of specially formed catalysts. This feature of the improved method is particularly advantageous since bauxite fines may be employed, thus rendering readily available for use large quantities of bauxite which may not be utilized as catalysts without pelleting or other preparation. The invention also overcomes the disadvantages arising from the use of beds of bauxite in lump form. In such instances, the lumps disintegrate, and gradually increase resistance to gas passage through the catalytic body. Further, by employing baffles of bauxite brick, as in the present method, the bricks have a pronounced catalytic effect on the reaction when the temperatures thereof are in the upper portion of the preferred temperature range, say, at temperatures above about 550° C. The present method is not limited, however, to the use of bauxite, since other catalysts such as iron oxide, pyrites cinder, tantalum oxide, aluminum oxide, and others may be employed.

It is also to be noted that the invention is not restricted to the reduction of sulfur dioxide to produce elemental sulfur and/or hydrogen sulfide. The process may be employed to effect other catalytic reactions, for example, oxidation of sulfur dioxide to sulfur trioxide. In such operations, the baffles of bauxite or other suitable refractory material may be impregnated with a suitable catalyst such as vanadium or platinum, and if desired further reaction may be brought about in the presence of platinum, vanadium or other catalyst in finely divided form, fed into the converter as already described in connection with the preferred embodiment of the invention.

In situations where operations are such that the gas stream, after admixture of reducing gases at inlet 57, may already be heated to approximately reactive temperatures, no further preheating of the gas stream is required, and the hot reaction products, which are to be recycled through the converter to control the temperature therein, may be cooled as required by means of a cooler, not shown, and then admitted directly into the converter. Further, reducing agents other than natural gas may be employed, and may be introduced into the converter without previous admixture with the incoming sulfur dioxide gas stream.

In the foregoing description and in the subtended claims, the term "finely divided" is intended to include granular material of any convenient size not too large to interfere with free passage of such material through the checkerwork.

I claim:

1. The method of reducing sulfur dioxide contained in a concentrated sulfur dioxide gas mixture which comprises diluting the gas mixture with inert gases whereby the volume of the gas mixture is increased, introducing the gas mixture and reducing agent into a reaction zone, maintaining in the reaction zone a checkerwork supporting finely divided, loosely associated catalytic material, and reacting sulfur dioxide and reducing agent while passing the same through the checkerwork.

2. Apparatus of the character described comprising a reaction chamber, means for passing reactant materials through the reaction chamber, means for forming and maintaining in the reaction chamber a plurality of suspended mounds of catalytic material, mounds of catalytic material supported by said second mentioned means, and means for replenishing the mounds of catalytic material during the course of the reaction.

3. Apparatus of the character described comprising a reaction chamber, means for introducing a reactant gas mixture into the reaction chamber, means for introducing finely divided catalytic material into the reaction chamber, means for forming and maintaining in the reaction chamber a catalyst body comprising checkerwork supporting mounds of loosely associated catalytic material whereby resistance to gas flow through the reaction chamber is reduced, means for withdrawing reaction products from the exit gas stream of the reaction chamber, and means for mixing such products with the reactant gas mixture entering the reaction chamber.

4. Apparatus of the character described comprising a reaction chamber, means for introducing finely divided catalytic material and reactant materials into the reaction chamber, means for effecting contact of reactant materials and catalytic material comprising a plurality of horizontal, superposed series of elongated baffles, the baffles of each series being spaced apart a distance less than the width of the baffles, the baffles of each series being angularly arranged with respect to the baffles of a contiguous series, the baffles of alternate series being disposed in parallel and vertically staggered relation, whereby a plurality of circuitous passages through the checkerwork are formed, mounds of loosely associated catalytic material on said baffles, means for withdrawing reaction products from the reaction chamber, and means for admixing portions of the reaction products with reactant materials entering the reaction chamber.

5. The method of conducting catalytic reactions which comprises introducing reactant substances into a reaction zone, and reacting the substances in the reaction zone by passing said substances through a checkerwork supporting spaced apart mounds of loosely associated catalytic material while causing at least a substantial portion of said substances to impinge upon the surfaces of said mounds in directions substantially normal to said surfaces.

6. The method of conducting catalytic reactions which comprises introducing reactant substances into a reaction zone, and reacting the substances in the reaction zone by passing said substances through a checkerwork supporting spaced apart mounds of loosely associated bauxite while causing at least a substantial portion of said substances to impinge upon the surfaces of said mounds in directions substantially normal to said surfaces.

7. The method of reducing sulfur dioxide which comprises introducing sulfur dioxide into a reaction zone, and causing reduction of the sulfur dioxide in the said zone by passing the sulfur dioxide through checkerwork supporting spaced apart mounds of loosely associated material aiding in the reduction while causing at least a substantial portion of reacting substances to impinge upon the surfaces of said mounts in directions substantially normal to said surfaces.

8. The method of reducing sulfur dioxide which comprises introducing sulfur dioxide and reducing agent into a reaction zone, maintaining in the reaction zone a catalyst body comprising checkerwork supporting mounds of loosely associated catalytic material, reacting the sulfur dioxide and reducing agent while passing the same in contact with the catalytic material and causing at least a substantial portion of reacting substances to impinge upon the surface of said mounds in a direction substantially normal to said surfaces.

9. The method of recovering sulfur values from sulfuric acid sludge which comprises decomposing sludge to form a sulfur dioxide gas mixture, cooling the gas mixture to remove therefrom condensable substances whereby the sulfur dioxide content of the gas mixture is increased and a relatively concentrated sulfur dioxide gas mixture produced, diluting the gas mixture with inert gas in amount sufficient to maintain the temperature of a subsequent reduction reaction not in excess of optimum reduction temperature whereby the volume of the gas mixture is increased, maintaining in a reaction zone a catalyst body comprising checkerwork supporting spaced apart mounds of loosely associated, finely divided catalytic material, introducing the gas mixture and reducing agent into the reaction zone, reacting sulfur dioxide and reducing agent while passing the same in contact with the catalytic material and causing at least a substantial portion of the reacting substances to impinge upon the surfaces of said mounds in a direction substantially normal to said surfaces, and recovering sulfur from the reaction products.

10. The method of recovering sulfur values from sulfuric acid sludge which comprises decomposing sludge to form a sulfur dioxide gas mixture, cooling the gas mixture to remove therefrom condensable substances whereby the sulfur dioxide content of the gas mixture is increased and a relatively concentrated sulfur dioxide gas mixture is produced, diluting the gas mixture with inert gas in amount sufficient to maintain the temperature of a subsequent reduction reaction not substantially in excess of about 650° C., maintaining in a reaction zone a catalyst body comprising a refractory checkerwork supporting loosely associated finely divided bauxite, introducing the gas mixture and reducing agent into the reaction zone, reacting sulfur dioxide and reducing agent while passing the same in contact with the bauxite and causing at least a substantial portion of the reacting substances to impinge upon the surfaces of said mounds in directions substantially normal to said surfaces, and recovering sulfur from the reaction products.

11. Apparatus of the character described comprising a reaction chamber, means for maintaining in the reaction chamber a plurality of spaced apart bodies of finely divided, loosely associated catalytic material, bodies of loosely associated catalytic material supported by said means, and means for passing reactant materials through the reaction chamber in a direction to cause at least a substantial portion of said reactant materials to impinge upon the surfaces of said bodies of catalytic material in a direction substantially normal to said surfaces.

12. The method of reducing sulfur dioxide contained in a concentrated sulfur dioxide gas mixture which comprises adding to the gas mixture inert gas in quantity sufficient to dilute the reactant gas mixture to such extent that the temperature of the subsequent reduction reaction does not exceed optimum reduction temperature, whereby the volume of the reactant gas mixture is increased, introducing the gas mixture and reducing agent into a reaction zone, and reacting the sulfur dioxide and reducing agent therein by passing the same through checkerwork supporting spaced apart suspended mounds of loosely associated catalytic material while causing at least a substantial portion of said substances to impinge upon the surfaces of said mounds in directions substantially normal to said surfaces.

HENRY F. MERRIAM.

---

CERTIFICATE OF CORRECTION.

Patent No. 2,090,217. August 17, 1937.

HENRY F. MERRIAM.

It is hereby certified that error appears in the printed specification of the above numbered patent requiring correction as follows: Page 4, second column, line 3, claim 2, before "suspended" insert the words spaced apart; and that the said Letters Patent should be read with this correction therein that the same may conform to the record of the case in the Patent Office.

Signed and sealed this 5th day of October, A. D. 1937.

Henry Van Arsdale (Seal) Acting Commissioner of Patents.

reaction zone a catalyst body comprising checkerwork supporting mounds of loosely associated catalytic material, reacting the sulfur dioxide and reducing agent while passing the same in contact with the catalytic material and causing at least a substantial portion of reacting substances to impinge upon the surface of said mounds in a direction substantially normal to said surfaces.

9. The method of recovering sulfur values from sulfuric acid sludge which comprises decomposing sludge to form a sulfur dioxide gas mixture, cooling the gas mixture to remove therefrom condensable substances whereby the sulfur dioxide content of the gas mixture is increased and a relatively concentrated sulfur dioxide gas mixture produced, diluting the gas mixture with inert gas in amount sufficient to maintain the temperature of a subsequent reduction reaction not in excess of optimum reduction temperature whereby the volume of the gas mixture is increased, maintaining in a reaction zone a catalyst body comprising checkerwork supporting spaced apart mounds of loosely associated, finely divided catalytic material, introducing the gas mixture and reducing agent into the reaction zone, reacting sulfur dioxide and reducing agent while passing the same in contact with the catalytic material and causing at least a substantial portion of the reacting substances to impinge upon the surfaces of said mounds in a direction substantially normal to said surfaces, and recovering sulfur from the reaction products.

10. The method of recovering sulfur values from sulfuric acid sludge which comprises decomposing sludge to form a sulfur dioxide gas mixture, cooling the gas mixture to remove therefrom condensable substances whereby the sulfur dioxide content of the gas mixture is increased and a relatively concentrated sulfur dioxide gas mixture is produced, diluting the gas mixture with inert gas in amount sufficient to maintain the temperature of a subsequent reduction reaction not substantially in excess of about 650° C., maintaining in a reaction zone a catalyst body comprising a refractory checkerwork supporting loosely associated finely divided bauxite, introducing the gas mixture and reducing agent into the reaction zone, reacting sulfur dioxide and reducing agent while passing the same in contact with the bauxite and causing at least a substantial portion of the reacting substances to impinge upon the surfaces of said mounds in directions substantially normal to said surfaces, and recovering sulfur from the reaction products.

11. Apparatus of the character described comprising a reaction chamber, means for maintaining in the reaction chamber a plurality of spaced apart bodies of finely divided, loosely associated catalytic material, bodies of loosely associated catalytic material supported by said means, and means for passing reactant materials through the reaction chamber in a direction to cause at least a substantial portion of said reactant materials to impinge upon the surfaces of said bodies of catalytic material in a direction substantially normal to said surfaces.

12. The method of reducing sulfur dioxide contained in a concentrated sulfur dioxide gas mixture which comprises adding to the gas mixture inert gas in quantity sufficient to dilute the reactant gas mixture to such extent that the temperature of the subsequent reduction reaction does not exceed optimum reduction temperature, whereby the volume of the reactant gas mixture is increased, introducing the gas mixture and reducing agent into a reaction zone, and reacting the sulfur dioxide and reducing agent therein by passing the same through checkerwork supporting spaced apart suspended mounds of loosely associated catalytic material while causing at least a substantial portion of said substances to impinge upon the surfaces of said mounds in directions substantially normal to said surfaces.

HENRY F. MERRIAM.

---

CERTIFICATE OF CORRECTION.

Patent No. 2,090,217.　　　　　　　　　　　　　　　　August 17, 1937.

HENRY F. MERRIAM.

It is hereby certified that error appears in the printed specification of the above numbered patent requiring correction as follows: Page 4, second column, line 3, claim 2, before "suspended" insert the words spaced apart; and that the said Letters Patent should be read with this correction therein that the same may conform to the record of the case in the Patent Office.

Signed and sealed this 5th day of October, A. D. 1937.

Henry Van Arsdale (Seal)　　　　　　　　　　　　　　　　Acting Commissioner of Patents.

CERTIFICATE OF CORRECTION.

Patent No. 2,090,217.　　　　　　　　　　　　　　　　August 17, 1937.

HENRY F. MERRIAM.

It is hereby certified that error appears in the printed specification of the above numbered patent requiring correction as follows: Page 4, second column, line 3, claim 2, before "suspended" insert the words spaced apart; and that the said Letters Patent should be read with this correction therein that the same may conform to the record of the case in the Patent Office.

Signed and sealed this 5th day of October, A. D. 1937.

Henry Van Arsdale (Seal)　　　　　　　　　　　　　　　　　Acting Commissioner of Patents.